United States Patent
Hoffmann et al.

(10) Patent No.: US 12,523,171 B2
(45) Date of Patent: Jan. 13, 2026

(54) FLASH-ATOMIZING AMMONIA IN A GAS TURBINE COMBUSTOR

(71) Applicant: GE Infrastructure Technology LLC, Greenville, SC (US)

(72) Inventors: Juergen Gerhard Hoffmann, Baden (CH); Rajani Kumar Akula, Bengaluru (IN)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/536,673

(22) Filed: Dec. 12, 2023

(65) Prior Publication Data
US 2025/0067213 A1   Feb. 27, 2025

(30) Foreign Application Priority Data
Aug. 25, 2023   (IN) .............................. 202311057106

(51) Int. Cl.
| | |
|---|---|
| *F02C 3/24* | (2006.01) |
| *F02C 6/18* | (2006.01) |
| *F02C 7/224* | (2006.01) |

(52) U.S. Cl.
CPC .................. *F02C 3/24* (2013.01); *F02C 6/18* (2013.01); *F02C 7/224* (2013.01)

(58) Field of Classification Search
CPC .... F02C 3/24; F02C 3/30; F02C 3/305; F02C 7/224; F02C 7/22; F02C 6/18
See application file for complete search history.

(56) References Cited

U.S. PATENT DOCUMENTS

| | | | | |
|---|---|---|---|---|
| 3,167,913 | A | * | 2/1965 | Muhlberg ................. F02C 3/20 60/39.53 |
| 4,558,664 | A | * | 12/1985 | Robben ................... F02B 45/10 123/23 |
| 7,284,378 | B2 | | 10/2007 | Amond, III et al. |
| 8,457,861 | B2 | | 6/2013 | Davis, Jr. et al. |
| 8,789,372 | B2 | | 7/2014 | Johnson et al. |
| 9,010,120 | B2 | | 4/2015 | DiCintio et al. |
| 9,557,050 | B2 | | 1/2017 | Vandervort et al. |

(Continued)

FOREIGN PATENT DOCUMENTS

WO   WO2019088107 A1   5/2019

OTHER PUBLICATIONS

Co-Pending U.S. Appl. No. 18/455,728, filed Aug. 25, 2023.
Co-Pending U.S. Appl. No. 18/455,749, filed Aug. 25, 2023.

*Primary Examiner* — Andrew H Nguyen
(74) *Attorney, Agent, or Firm* — Dority & Manning, P.A.

(57) ABSTRACT

Gas turbine systems and methods of operation are provided. The gas turbine system includes a combustion section having at least one combustor and an ammonia supply system. The method includes generating flash-atomizing ammonia. The flash-atomizing ammonia is generated by pressurizing ammonia from the ammonia supply system to an injection pressure that is greater than a combustion chamber pressure within the combustor. The flash-atomizing ammonia is further generated by heating the ammonia to an injection temperature greater than a boiling temperature of ammonia at the combustion chamber pressure. The method further includes providing the flash-atomizing ammonia to the combustor.

16 Claims, 5 Drawing Sheets

(56) References Cited

U.S. PATENT DOCUMENTS

| | | | |
|---|---|---|---|
| 2011/0083441 A1* | 4/2011 | Khosla | F02C 7/22 |
| | | | 60/746 |
| 2013/0042622 A1* | 2/2013 | Zebrowski | F02C 7/232 |
| | | | 60/734 |
| 2019/0017707 A1* | 1/2019 | Kim | F23R 3/286 |
| 2020/0032676 A1* | 1/2020 | Nose | F23R 3/36 |
| 2021/0071870 A1 | 3/2021 | Bulat | |
| 2022/0333534 A1* | 10/2022 | Smith | F02C 9/40 |
| 2022/0403783 A1* | 12/2022 | Miller | F02C 7/224 |
| 2023/0407784 A1* | 12/2023 | Takeishi | F02C 7/224 |
| 2024/0117763 A1* | 4/2024 | Ito | F02C 3/22 |

\* cited by examiner

FLASH-ATOMIZING AMMONIA IN A GAS TURBINE COMBUSTOR

CROSS-REFERENCE TO RELATED APPLICATIONS

This application claims the benefit of priority to Indian Provisional Patent Application No. 202311057106, filed on Aug. 25, 2023, the disclosure of which is incorporated by reference herein in its entirety.

FIELD

The present disclosure relates generally to operating gas turbine combustors on alternate fuels. In particular, the present disclosure relates to a system and method of flash-atomizing ammonia for use in a gas turbine combustor.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas for traditional systems) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Traditional gas turbine engines include one or more combustors that burn a mixture of natural gas and air within the combustion chamber to generate the high pressure and temperature combustion gases. As a byproduct, nitrogen oxides (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Alternate fuels can be used as a substitute for natural gas to reduce the production of NOx in the combustor. However, many alternate fuels have burning characteristics that make them unsuitable for use with traditional combustor operating methods. For example, such characteristics may include flame speed that is too slow/fast, flame temperature that is too hot/cold, and/or unwanted combustion byproducts.

Accordingly, an improved system and method of operating a combustor that allows for use of alternate fuels, such as ammonia ($NH_3$), is desired and would be appreciated in the art.

BRIEF DESCRIPTION

Aspects and advantages of the gas turbine systems and methods in accordance with the present disclosure will be set forth in part in the following description, or may be obvious from the description, or may be learned through practice of the technology.

In accordance with one embodiment, a method of operating a gas turbine system is provided. The gas turbine system includes a combustion section having at least one combustor and an ammonia supply system. The method includes generating flash-atomizing ammonia. The flash-atomizing ammonia is generated by pressurizing ammonia from the ammonia supply system to an injection pressure that is greater than a combustion chamber pressure within the combustor. The flash-atomizing ammonia is further generated by heating the ammonia to an injection temperature greater than a boiling temperature of ammonia at the combustion chamber pressure. The method further includes providing the flash-atomizing ammonia to the combustor.

In accordance with another embodiment, a gas turbine system is provided. The gas turbine system includes, in a serial flow order, a compressor section, a combustion section having at least one combustor, and a turbine section. The gas turbine system further includes an ammonia supply system configured to generate flash-atomizing ammonia. The ammonia supply system includes a liquid ammonia supply and an ammonia supply circuit fluidly coupling the liquid ammonia supply to the combustor. The ammonia supply system further includes a pressurizing means disposed on the ammonia supply circuit and configured to pressurize ammonia from the liquid ammonia supply to an injection pressure that is greater than a combustion chamber pressure within the combustor. The liquid ammonia supply system further includes a heat exchanger that is disposed in thermal communication on the ammonia supply circuit and configured to heat the ammonia to an injection temperature greater than a boiling temperature of ammonia at the combustion chamber pressure.

These and other features, aspects and advantages of the present gas turbine systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present gas turbine systems and methods, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present gas turbine systems and methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid including a supercritical fluid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present) or A is false (or not present) and B is true (or present).

Here and throughout the specification and claims, range limitations are combinable and interchangeable. Such range combinations include all the sub-ranges contained therein unless context or language indicates otherwise. For example, all ranges disclosed herein are inclusive of the endpoints, and the endpoints are independently combinable with each other.

As used herein, the term "line" may refer to a pipe, hose, tube, or other fluid carrying conduit.

Referring now to the drawings, FIGS. 1 through 4 each illustrate a schematic diagram of a gas turbine system 10. The gas turbine system 10 may include a turbomachine, which in the illustrated embodiments is a gas turbine 11. Although an industrial or land-based gas turbine is shown and described herein, the present disclosure is not limited to a land-based and/or industrial gas turbine unless otherwise specified in the claims. For example, the methods and systems as described herein may be used in any type of turbomachine including but not limited to gas turbine an aircraft gas turbine or a marine gas turbine.

As shown in FIGS. 1 through 4, gas turbine 11 generally includes, in a serial flow order (e.g., from forward to aft), a compressor section 14, a combustor section 16, and a turbine section 18. In other words, the gas turbine 11 includes the compressor section 14 that is disposed downstream of an inlet section (not shown), a plurality of combustors 17 (only one of which is shown) within a combustor section 16 disposed downstream of the compressor section 14, a turbine section 18 disposed downstream of the combustor section 16, and an exhaust section 20 disposed downstream of the turbine section 18. Additionally, the gas turbine 11 may include one or more shafts 22 coupled between the compressor section 14 and the turbine section 18.

During operation, a working fluid such as air 13 flows through the inlet section and into the compressor section 14 where the air 13 is progressively compressed, thus providing compressed air 19 to the combustors 17 of the combustor section 16. The compressed air 19 is mixed with fuel and burned within each combustor 17 to produce combustion gases 34. The combustion gases 34 flow through the hot gas path from the combustor section 16 into the turbine section 18, in which energy (kinetic and/or thermal) is transferred from the combustion gases 34 to rotor blades within the turbine section 18, causing the shaft 22 to rotate. The mechanical rotational energy may then be used to power the compressor section 14 and/or a load 21 (such a generator) to generate electricity. The combustion gases 34 exiting the turbine section 18 may then be exhausted from the gas turbine 11 as exhaust gases 35 via the exhaust section 20. Particularly, exhaust gases 35 exiting the turbine section 18 may be provided to a heat recovery steam generator (HRSG) 50 of the exhaust section 20. Stated otherwise, the HRSG 50 may receive the exhaust gases 35 from the turbine section 18 (e.g., from an outlet of the turbine section 18). The HRSG 50 may include a duct 52 that defines a flow area 54 through which the exhaust gases 35 flow.

The combustor 17 may extend between an inlet end or forward end 56 and an outlet end or aft end 58, and the combustor 17 may define a combustion chamber 66. In many embodiments, the combustor 17 may include a fuel nozzle 60 at the forward end 56. The fuel nozzle 60 may receive compressed air 19 from the compressor section 14 and fuel (such as ammonia) from an ammonia supply system 100, and the fuel nozzle 60 may provide a first mixture of fuel/air to the combustion chamber 66, where the first mixture is combusted to generate combustion gases in a primary combustion zone. In various embodiments, the fuel nozzle 60 may include a bundled tube fuel nozzle (often referred to as a "micromixer") and/or a fuel nozzle having a plurality of swirling vanes (often referred to as a "swozzle") and/or any other type of fuel nozzle.

Additionally, the combustor 17 may include a fuel injector 62 disposed downstream (or aft) of the fuel nozzle 60. The fuel injector 62 may be fluidly coupled to the ammonia supply system 100 in order to provide a second mixture of fuel/air to the combustion chamber 66, where the second mixture is combusted to generate combustion gases in a secondary combustion zone. The primary combustion zone may be defined between the fuel nozzle 60 and the fuel injector 62, and the secondary combustion zone may be defined between the fuel injector 62 and the aft end 58.

In many embodiments, the ammonia supply system 100 may be configured to generate flash-atomizing ammonia, which may be provided to the combustor 17 for generating combustion gases. As used herein, "flash-atomizing ammonia" may refer to ammonia (either liquid ammonia or supercritical ammonia) having adequate properties (e.g., temperature and pressure) that promote flash atomization of the ammonia when introduced to a combustor. As used herein, "flash atomization" may refer to a process in which a liquid (or supercritical fluid) is rapidly dispersed into small droplets or particles by a sudden release of pressure. The sudden release of pressure causes the liquid (or supercritical fluid) to undergo a rapid expansion, resulting in a mist or spray of droplets. The mist or spray of droplets is more readily combusted to completion.

The ammonia supply system 100 may include a liquid ammonia supply 102, an ammonia supply circuit 104, a pressurizing means 106, a heat exchanger or first heat exchanger 108, and a second heat exchanger 110. The liquid ammonia supply 102 may be a tank, storage container, or other means for storing ammonia ($NH_3$).

The ammonia supply circuit 104 may fluidly couple the liquid ammonia supply 102 to the combustor 17. In many embodiments, the ammonia supply circuit 104 may include a first supply line 112 and a second supply line 114. The first supply line 112 may extend from the liquid ammonia supply 102 through the first heat exchanger 108 to the combustor 17, and the second supply line 114 may extend from the first supply line 112 to the combustor 17. As used herein, the term "line" may refer to a pipe, hose, tube, or other fluid carrying conduit.

In exemplary embodiments, the first heat exchanger 108 and the second heat exchanger 110 may each be disposed in thermal communication on the ammonia supply circuit 104. The first heat exchanger 108 may be configured to heat the ammonia from the liquid ammonia supply 102 to an injection temperature that is higher than a boiling temperature of ammonia at the combustion chamber pressure. In exemplary embodiments, the injection temperature may be greater than about 100° C. In some embodiments, the injection temperature may be between about 100° C. and an exhaust gas temperature. In various embodiments, the injection temperature may be between about 100° C. and about 300° C. Particularly, once the ammonia from the liquid ammonia supply 102 is pressurized by the pressurizing means 106 to an injection pressure (discussed in detail below), the pressurized ammonia may be supplied to the first heat exchanger 108 to heat the pressurized ammonia to the injection temperature, thereby generating the flash-atomizing ammonia 120. The injection temperature is greater than the boiling temperature of ammonia at the combustion chamber pressure.

In some implementations, in which the flash-atomizing ammonia 120 is provided to the combustor 17 in a liquid state, the first heat exchanger 108 may heat the pressurized ammonia to an injection temperature that is between about 100° C. and about 200° C. In preferred implementations, in which the flash-atomizing ammonia 120 is provided to the combustor 17 in a supercritical state (i.e., "supercritical ammonia"), the first heat exchanger 108 may heat the pressurized ammonia to an injection temperature that is between about 200° C. and about 300° C. As should be appreciated, supercritical ammonia is ammonia that is above its critical temperature and pressure, which means that the ammonia is in a state that is neither a discrete liquid nor a discrete gas.

The first heat exchanger 108 may be disposed on the first supply line 112, and the second heat exchanger 110 may be disposed on the second supply line 114. In such embodiments, the second supply line 114 may extend from the first supply line 112 downstream of the first heat exchanger 108 to the combustor 17. In this way, all of the ammonia from the liquid ammonia supply 102 may be pressurized by the pressurizing means 106 and subsequently flow through the first heat exchanger 108 to generate the flash-atomizing ammonia 120. Subsequently, a first portion 122 of the flash-atomizing ammonia 120 may be provided to the fuel nozzle 60 and/or the fuel injector 62 of the combustor 17, and a second portion 124 of the flash-atomizing ammonia 120 may be provided to the second heat exchanger 110. The second heat exchanger 110 may further heat the second portion 124 of the flash-atomizing ammonia 120 to generate gaseous ammonia 126, which may be provided to the fuel nozzle 60 and/or the fuel injector 62.

Figure 1:
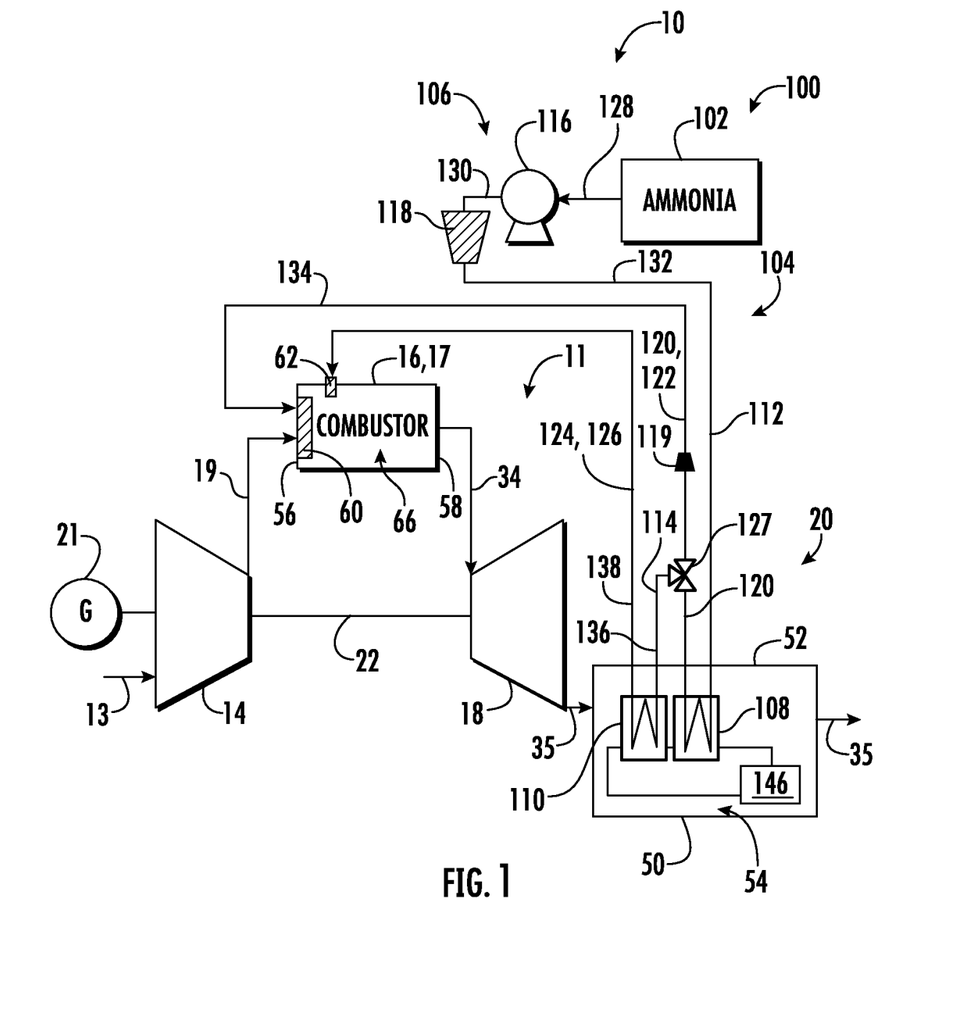
FIG. 1 is a schematic illustration of a gas turbine system in accordance with embodiments of the present disclosure.

For example, as shown in FIG. 1, the first supply line 112, which conveys the flash-atomizing ammonia 120, may extend to (and fluidly couple to) the fuel nozzle 60, such that the flash-atomization of ammonia takes place at the forward end 56 of the combustor 17. In such embodiments, the second supply line 114, which conveys the gaseous ammonia, may extend to (and fluidly couple to) the fuel injector 62, such that the gaseous ammonia is introduced into the combustor 17 downstream of the forward end 56 and into the secondary combustion zone.

Figure 2:
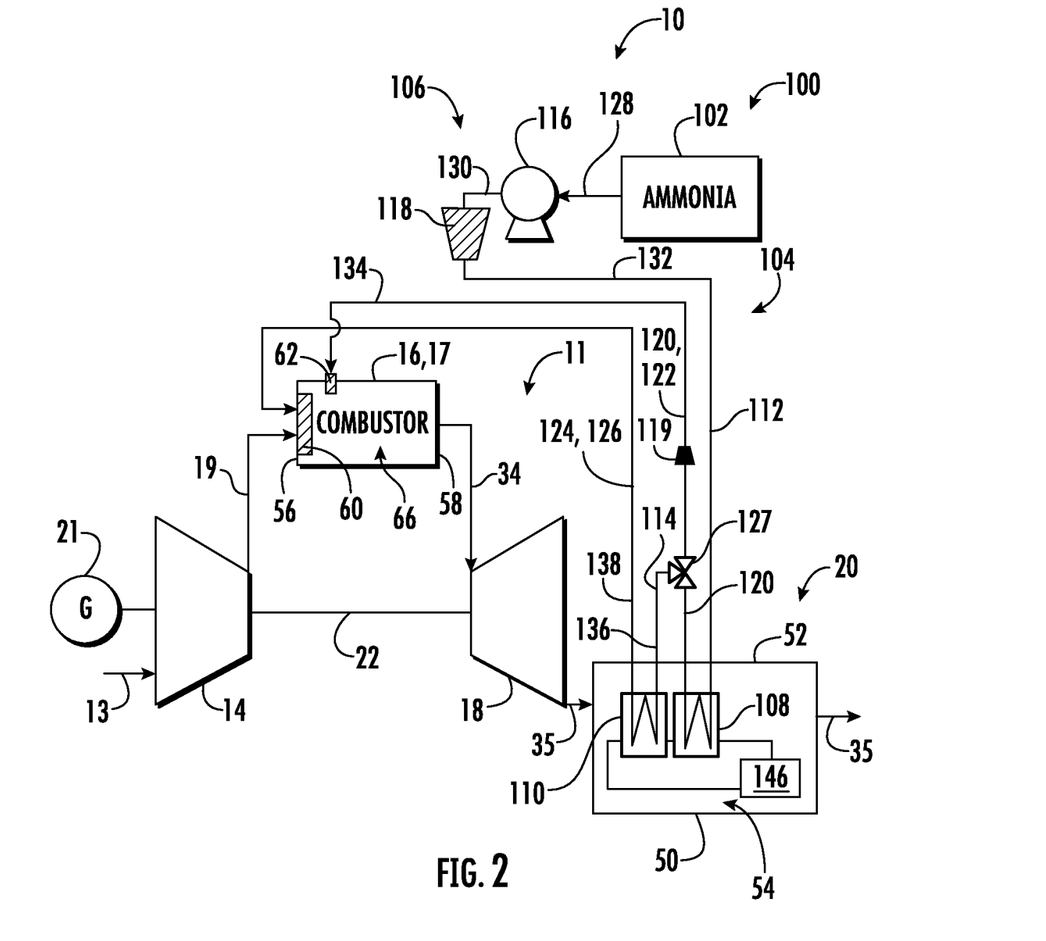
FIG. 2 is a schematic illustration of a gas turbine system in accordance with embodiments of the present disclosure.

In other embodiments, as shown in FIG. 2, the first supply line 112, which conveys the flash-atomizing ammonia 120, may extend to (and fluidly couple to) the fuel injector 62, such that the flash-atomization of ammonia takes place downstream of the forward end 56 of the combustor 17. In such embodiments, the second supply line 114, which conveys the gaseous ammonia, may extend to (and fluidly couple to) the fuel nozzle 60, such that the gaseous ammonia is introduced into the combustor 17 the forward end 56. In such embodiment, gaseous ammonia is combusted in the primary combustion zone, while flash-atomized ammonia is combusted in the secondary combustion zone.

In some embodiments, at least one valve 127 may be disposed on the ammonia supply circuit 104. For example, the at least one valve 127 may be a three-way control valve that is disposed on, and in fluid communication with, the ammonia supply circuit 104 at the junction between the first supply line 112 and the second supply line 114, such that the valve 127 may be actuatable to control the division of the flash-atomizing ammonia 120 into the first portion 122 and the second portion 124. In this way, the valve 127 may regulate the flow between the first supply line 112 and the second supply line 114. In other embodiments (not shown), the at least one valve 127 may include a first valve positioned on, and in fluid communication with, the first supply line 112 and a second valve positioned on, and in fluid communication with, the second supply line 114. In such embodiments, the first valve and the second valve may be actuated together, or separately, to regulate the flow between the first supply line 112 and the second supply line 114.

The pressurizing means 106 may be disposed on the ammonia supply circuit 104 and configured to pressurize ammonia from the liquid ammonia supply 102 to an injection pressure. In many embodiments, as shown, the pressurizing means 106 may be disposed upstream of the first heat exchanger 108 (with respect to the flow of ammonia through the first supply line 112). The pressurizing means 106 may include at least one of a pump 116 (such as a pressurizing pump, booster pump, or other) and/or an ammonia compressor 118. The pump 116 and the ammonia compressor 118 may be disposed on the first supply line 112 downstream of the liquid ammonia supply 102 and upstream of the first heat exchanger 108.

In some embodiments, as shown in FIGS. 1 and 2, the ammonia compressor 118 may be a first ammonia compressor 118, and the system 10 may further include a second ammonia compressor 119. The second ammonia compressor 119 may be disposed on the first supply line downstream of the first heat exchanger 108 and the valve 127. The first ammonia compressor 118 may pressurize all of the ammonia from the ammonia supply to a first pressure, and the second ammonia compressor 119 may further pressurize the flash-atomizing ammonia 120 to a second pressure that is higher than the first pressure. Both the first pressure and the second pressure may be greater than the combustion chamber pressure.

In many embodiments, the injection pressure may be at least 1.2 times greater than a combustion chamber pressure within the combustor. In other embodiments, the injection pressure may be at least 1.5 times greater than a combustion chamber pressure within the combustor 17 and, in some embodiments, may be between about 1.5 and about 7 times greater than a combustion chamber pressure within the combustor 17. In some embodiments, the injection pressure may be between about 2.5 and about 6 times greater than a combustion chamber pressure within the combustor 17. In preferred embodiments, the injection pressure may be between about 3 and about 5 times greater than a combustion chamber pressure within the combustor 17. In other words, the injection pressure may be at least 150% of the combustion chamber pressure (i.e., the pressure within the combustion chamber 66), or between about 200% and about 700%, or between about 250% and about 600%, or between about 300% and about 500%. For example, in various embodiments, the injection pressure may be between about 100 bar and about 250 bar, or between about 150 bar and about 250 bar, or between about 160 bar and about 240 bar, or between about 175 bar and about 225 bar, or between about 190 bar and about 210 bar.

The ranges for injection pressure disclosed herein advantageously facilitate flash atomization of ammonia when introduced into the combustion chamber. For example, if the injection pressure is too low (e.g., the injection pressure falls below the lower threshold in the range), then the flash atomization effect of ammonia may not occur. Pressurizing the ammonia beyond the upper threshold may not be desired because it may be higher than is necessary for flash atomization and may require more energy without a much greater benefit.

In many embodiments, the first supply line 112 may include a pump inlet portion 128, a pump outlet portion or ammonia compressor inlet portion 130, a first heat exchanger inlet portion 132, and a first heat exchanger outlet portion 134. The pump inlet portion 128 may extend between the liquid ammonia supply 102 and the pump 116. The compressor inlet portion 130 may extend between the pump 116 and the ammonia compressor 118. The first heat exchanger inlet portion 132 may extend between the ammonia compressor 118 and the first heat exchanger 108. The first heat exchanger outlet portion 134 may extend between the first heat exchanger and one of the fuel nozzle 60 (FIG. 1) or the fuel injector 62 (FIG. 2).

The second supply line 114 may include a second heat exchanger inlet portion 136 and a second heat exchanger outlet portion 138. The second heat exchanger inlet portion 136 may extend between the first supply line 112 (particularly from the first heat exchanger outlet portion 134) to the second heat exchanger 110. The second heat exchanger outlet portion 138 may extend from the second heat exchanger 110 to one of the fuel injector 62 (FIG. 1) or the fuel nozzle 60 (FIG. 2).

Figure 3:
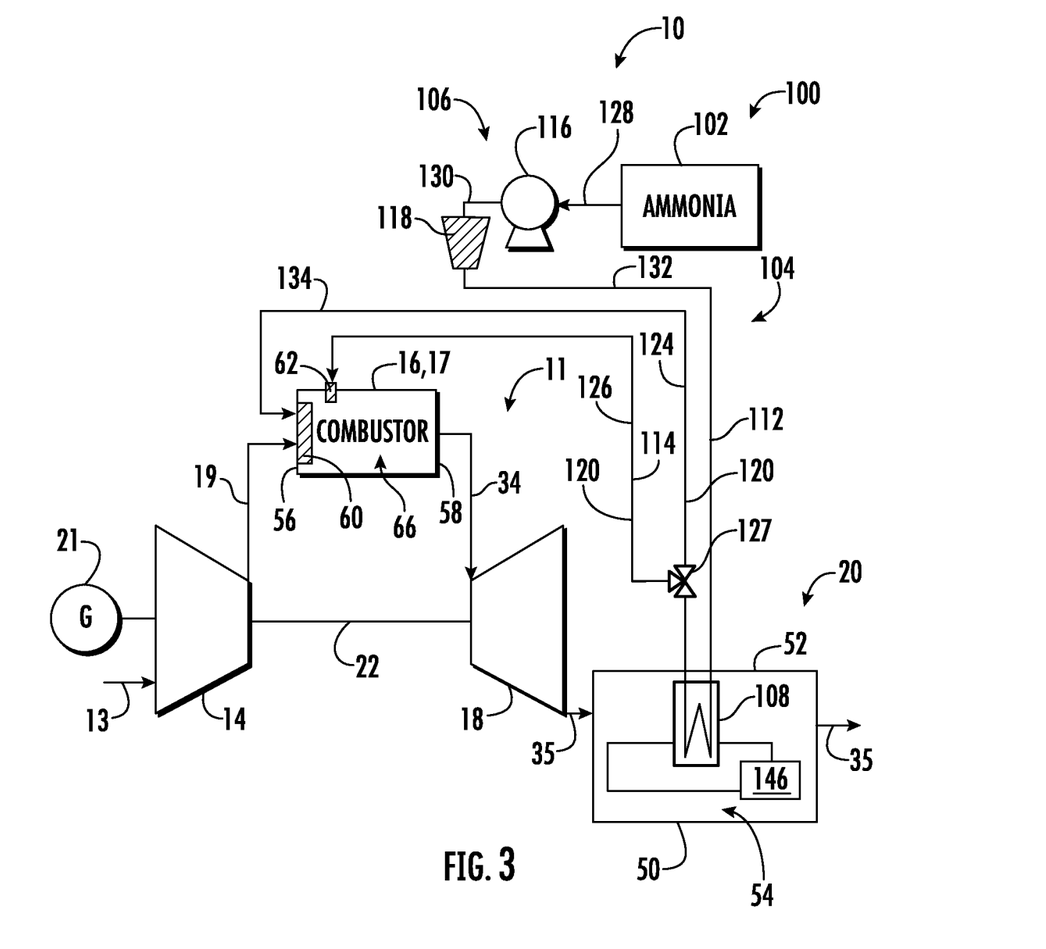
FIG. 3 is a schematic illustration of a gas turbine system in accordance with embodiments of the present disclosure.

In many embodiments, as shown in FIGS. 1 through 3, the first heat exchanger 108 may be disposed in the HRSG 50, such that the pressurized ammonia from the pressurizing means 106 is heated by the exhaust gases 35 within the first heat exchanger 108 to the injection temperature that is higher than a boiling temperature of ammonia at the combustion chamber pressure. Additionally, as shown in FIGS. 1 and 2, the second heat exchanger 110 may also be disposed in the HRSG 50, such that the second portion 124 of flash-atomizing ammonia 120 is further heated by the exhaust gases 35 within the second heat exchanger 110 to produce gaseous ammonia 126. The second heat exchanger 110 may be disposed downstream of the first heat exchanger 108 with respect to the flow of ammonia through the ammonia supply circuit 104, and the second heat exchanger 110 may be disposed upstream of the first heat exchanger 108 with respect to the flow of exhaust gases 35 through the HRSG 50.

In various embodiments, as shown in FIGS. 1 through 3, the HRSG 50 may further include a water steam cycle 146, which may be disposed at least partially in the flow area 54. The water steam cycle 146 may include one or more condensers, evaporators, boilers, pumps, valves, compressors, and water/steam storage tanks. The water steam cycle 148 may generate steam and/or hot water (e.g., via thermal communication with the exhaust gases in the HRSG 50). The steam and/or hot water may be in fluid and/or thermal communication with both the first heat exchanger 108, 110 for heating the ammonia to the injection temperature. In this way, hot water and steam are generated in the HRSG by the water steam cycle 146, and the steam or the hot water from the water steam cycle 146 may be disposed such that ammonia is heated by the steam or hot water from the water steam cycle to the injection temperature.

Figure 4:
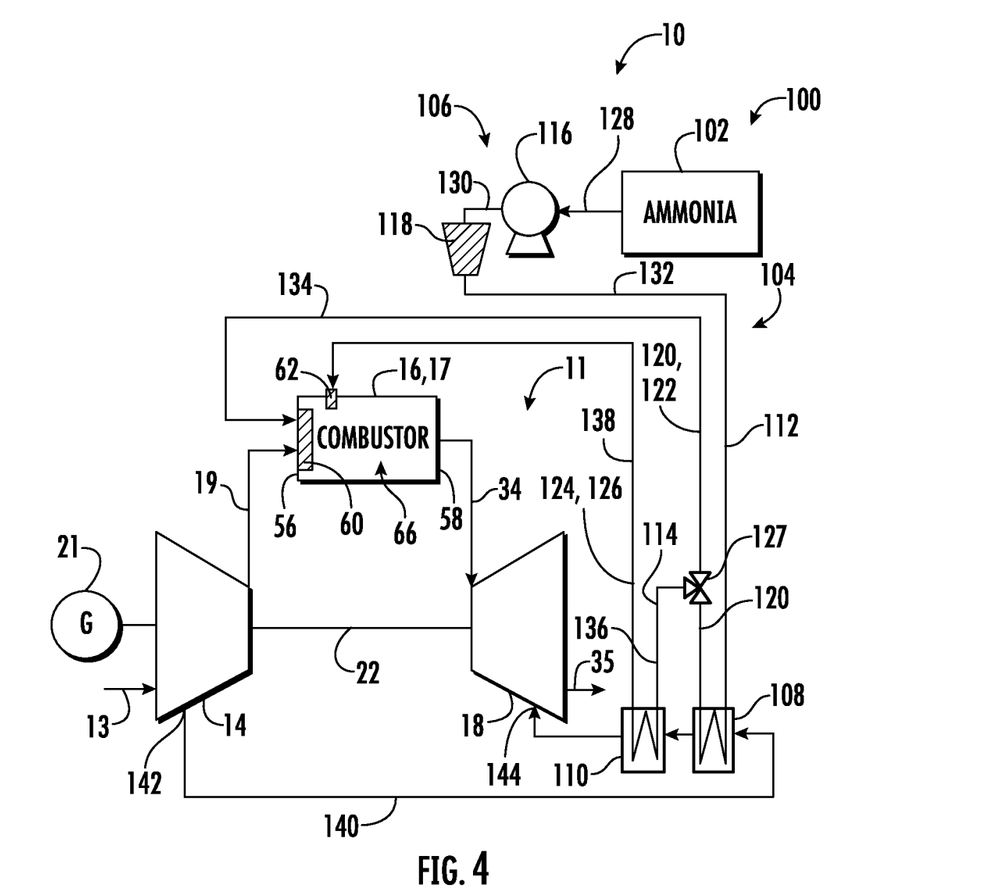
FIG. 4 is a schematic illustration of a gas turbine system in accordance with embodiments of the present disclosure.

In other embodiments, as shown in FIG. 4, the first heat exchanger 108 and/or the second heat exchanger 110 may be heated by bleed air from the compressor section 14. For example, in such embodiments, the gas turbine system 10 may include a compressor bleed line 140 that extends from an inlet 142 in fluid communication with the compressor section 14 to an outlet 144 in fluid communication with the turbine section 18. The compressor bleed line 140 may pull a portion of the air from the compressor section 14 for cooling the various hot gas path components in the turbine section 18. However, the compressor air may be relatively hotter than the ammonia, such that the bleed air may be used for heating the ammonia prior to the bleed air being used for cooling purposes in the turbine section 18. In this way, the compressor bleed line 140 may be fluidly coupled to the first heat exchanger 108 and/or the second heat exchanger 110. The first heat exchanger 108 may be disposed upstream of the second heat exchanger 110 on the compressor bleed line 140 with respect to the flow of bleed air through the compressor bleed line 140.

Referring briefly to FIG. 3, in some embodiments, the flash-atomizing ammonia may be provided to both the fuel nozzle 60 and the fuel injector 62. In such embodiments, there may be no second heat exchanger 110. That is, only the first heat exchanger 108 may be provided to heat all of the ammonia to the injection temperature (e.g., the flash-atomizing temperature) for injection in both the fuel nozzle 60 and the fuel injector 62. In such embodiments, the second supply line 114 may extend directly from the first supply line 112 downstream of the first heat exchanger 108 to the combustor 17.

Figure 5:
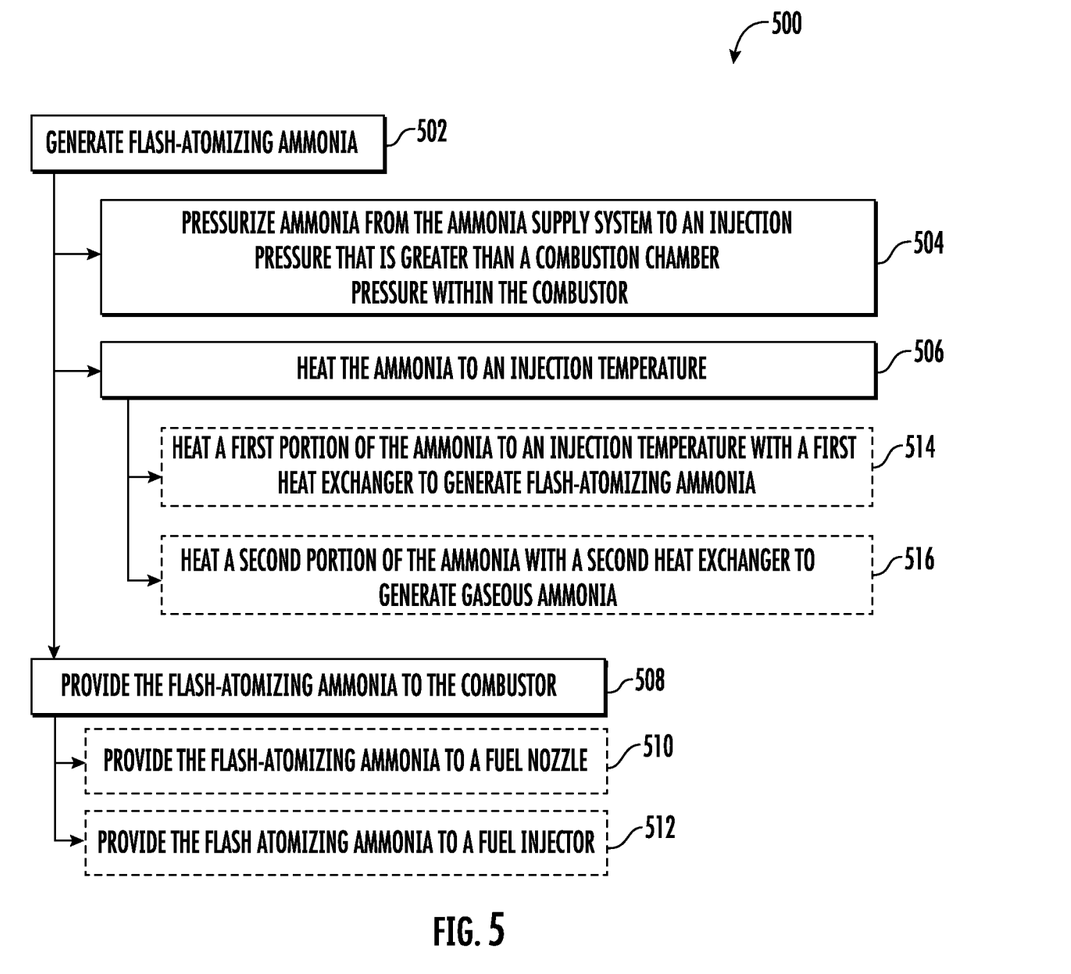
FIG. 5 is a flow diagram of a method of operating a gas turbine system in accordance with embodiments of the present disclosure.

Referring now to FIG. 5, a flow diagram of one embodiment of a method 500 of operating a gas turbine system is illustrated in accordance with embodiments of the present subject matter. In general, the method 500 will be described herein with reference to the gas turbine engine system 10, the gas turbine 11, and the ammonia supply system 100 described above with reference to FIGS. 1-4. However, it will be appreciated by those of ordinary skill in the art that the disclosed method 500 may generally be utilized with any suitable turbomachine and/or may be utilized in connection with a system having any other suitable system configuration. In addition, although FIG. 5 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As discussed above, the gas turbine system of the method 500 may include a gas turbine having a combustion section with at least one combustor and an ammonia supply system. The method 500 may include a step 502 of generating flash-atomizing ammonia, which may be done by performing steps 504 and 506. For example, as shown, step 504 may include pressurizing ammonia from the ammonia supply system to an injection pressure that is greater than a combustion chamber pressure within the combustor (such as at least 1.5 times greater). The pressurizing means may include a pump or compressor that increases the pressure of the ammonia from the ammonia supply system. For example, the ammonia supply system may store liquid ammonia, which is provided to the pressurizing means for pressurization.

Subsequently, at step 506, the method 500 may include heating (e.g., with a heat exchanger) the ammonia to an injection temperature that is higher than a boiling temperature of ammonia at the combustion chamber pressure. The injection temperature may be a temperature that promotes the flash atomization of the ammonia when injected into the combustor. Specifically, the injection temperature is a temperature greater than the boiling temperature of ammonia at the combustion chamber pressure. When the ammonia is both pressurized to the injection pressure and heated to the injection temperature, it may be referred to as "flash-atomizing ammonia" because, when injected into the combustor at this temperature/pressure, the ammonia will atomize due to the large drop in pressure when entering the combustion chamber. This advantageously breaks the ammonia up into smaller droplets, which promote uniform/complete combustion of the ammonia, thereby increasing efficiency of the gas turbine system. Smaller droplets in this context means droplets which are smaller than the droplets which would be generated with the same injection nozzle if pressurized ammonia would be injected with an injection temperature which is below the boiling temperature of ammonia at the combustion chamber pressure.

In some embodiments, the gas turbine system further includes a compressor section, a turbine section, and a heat recovery steam generator (HRSG) that receives exhaust gases from the turbine section. In such embodiments, the heat exchanger may be disposed in the HRSG such that the ammonia is heated by the exhaust gases to the injection temperature. In other embodiments, the gas turbine system may include a compressor bleed line fluidly coupled to the compressor section and the heat exchanger such that the ammonia is heated by compressor bleed air to the injection temperature.

The method 500 may further include, at step 508, providing the flash-atomizing ammonia to the combustor. In some embodiments, as shown by optional step 510 (indicated as optional by the dashed box), the flash-atomizing ammonia may be provided to a fuel nozzle. In such embodiments, the flash-atomizing ammonia may be introduced into the combustion chamber at a forwardmost end of the combustion chamber (i.e., into a primary combustion zone). In other embodiments, as shown by optional step 512, the method 500 may include providing the flash-atomizing ammonia to a fuel injector. In such embodiments, the flash-atomizing ammonia may be provided to the combustion chamber downstream of the forwardmost end of the combustion chamber (i.e., downstream of the fuel nozzle and into a secondary combustion zone). In yet still further embodiments, the flash-atomizing ammonia may be provided to both the fuel nozzle at the forward end and the fuel injector downstream of the forward end.

In various implementations, the method 500 may include an optional step 514 of heating a first portion of the ammonia from the ammonia supply system (which has already been pressurized in step 504 to the injection pressure) to an injection temperature with a first heat exchanger to generate the flash-atomizing ammonia. Additionally, the method 500 may include, in optional step 516, further heating a second portion of the ammonia from the ammonia supply system (which has already been pressurized to the injection pressure and heated to the injection temperature) with a second heat exchanger to generate gaseous ammonia. That is, a portion of the flash-atomizing ammonia from the first heat exchanger may be further heated to generate gaseous ammonia.

Notably, the gaseous ammonia may be injected into the combustion chamber at a pressure that is less than a pressure of the flash-atomizing ammonia. For example, the gaseous ammonia may be pressurized to a first pressure (e.g., with a first ammonia compressor), and the flash-atomizing ammonia may be pressurized to a second pressure (e.g., with a second ammonia compressor, or with both the first ammonia compressor and the second ammonia compressor). The second pressure may be greater than the first pressure. Both the first pressure and the second pressure may be greater than the combustion chamber pressure.

In other words, the method may include pressurizing a second ammonia flow above the combustion chamber pressure (e.g., with the first ammonia compressor). The method may further include heating the second ammonia flow (e.g., with the first heat exchanger and the second heat exchanger) to generate gaseous ammonia. Further, the method may include providing the gaseous ammonia to the combustor.

In such implementations, where both gaseous ammonia and flash-atomizing ammonia are generated, the flash-atomizing ammonia may be provided to one of the fuel nozzles or the fuel injector, and the gaseous ammonia may be provided to the other of the fuel nozzles or the fuel injector.

In operation, providing flash-atomizing ammonia to the combustion section advantageously promotes greater mixing between air and ammonia within the combustor, thereby promoting complete and uniform combustion. This reduces local peak temperature and consequently lower emissions, results in a more complete usage of fuel, higher temperature combustion gases, and greater overall gas turbine efficiency.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

Further aspects of the invention are provided by the subject matter of the following clauses:

A method of operating a gas turbine system, the gas turbine system comprising a combustion section having at least one combustor and an ammonia supply system, the method comprising: generating flash-atomizing ammonia by: pressurizing ammonia from the ammonia supply system to an injection pressure that is greater than a combustion chamber pressure within the combustor; heating the ammonia to an injection temperature greater than a boiling temperature of ammonia at the combustion chamber pressure; and providing the flash-atomizing ammonia to the combustor.

The method as in any preceding clause, wherein the injection pressure is between about 100 bar and about 250 bar.

The method as in any preceding clause, wherein the injection pressure is between about 1.5 and about 7 times greater than the combustion chamber pressure.

The method as in any preceding clause, wherein heating the ammonia further comprises: heating, with the heat exchanger, the pressurized ammonia to an injection temperature of greater than 100° C.

The method as in any preceding clause, wherein the method further comprises: pressurizing a second ammonia flow above the combustion chamber pressure; heating the second ammonia flow to generate gaseous ammonia; providing the gaseous ammonia to the combustor.

The method as in any preceding clause, wherein the combustor comprises a fuel nozzle at a forward end and a fuel injector disposed downstream of the fuel nozzle, and wherein the method further comprises: providing the gaseous ammonia to one of the fuel nozzle and the fuel injector; and providing the flash-atomizing ammonia to the other of the fuel nozzle and the fuel injector.

The method as in any preceding clause, wherein the gas turbine system further comprises a compressor section, a turbine section, and a heat recovery steam generator (HRSG) that receives exhaust gases from the turbine section, and wherein the heat exchanger is disposed in the HRSG such that the ammonia is heated by the exhaust gases or wherein steam is generated in the HRSG and steam or hot water from a water steam cycle connected to the HRSG is disposed such that ammonia is heated by the steam or hot water from the water steam cycle.

The method as in any preceding clause, wherein the gas turbine system further comprises a compressor section and a compressor bleed line fluidly coupled to the compressor section and the heat exchanger such that the ammonia is heated by compressor bleed air.

The method as in any preceding clause, wherein the heating step is after the pressurizing step.

A gas turbine system comprising: a gas turbine comprising, in a serial flow order, a compressor section, a combustion section having at least one combustor, and a turbine section; an ammonia supply system configured to generate flash-atomizing ammonia, the ammonia supply system comprising: a liquid ammonia supply; an ammonia supply circuit fluidly coupling the liquid ammonia supply to the combustor; a pressurizing means disposed on the ammonia supply circuit and configured to pressurize ammonia from the liquid ammonia supply to an injection pressure that is greater than a combustion chamber pressure within the combustor; a heat exchanger disposed in thermal communication on the ammonia supply circuit and configured to heat the ammonia to an injection temperature greater than a boiling temperature of ammonia at the combustion chamber pressure.

The gas turbine system as in any preceding clause, wherein the ammonia supply system comprises a first supply line and a second supply line, the first supply line extending from the liquid ammonia supply to the combustor, wherein the heat exchanger is disposed on the first supply line, and wherein the second supply line extends from the first supply line downstream of the heat exchanger to the combustor.

The gas turbine system as in any preceding clause, wherein at least one valve is disposed on the ammonia supply circuit and in fluid communication between the first supply line and the second supply line.

The gas turbine system as in any preceding clause, wherein the heat exchanger is a first heat exchanger, and wherein the ammonia supply system further comprises a second heat exchanger disposed on the second supply line.

The gas turbine system as in any preceding clause, wherein the combustor includes a fuel nozzle at a forward end and a fuel injector downstream of the fuel nozzle, wherein the first supply line extends to one of the fuel nozzle or the fuel injector, and wherein the second supply line extends to the other of the fuel nozzle or the fuel injector.

The gas turbine system as in any preceding clause, further comprising a heat recovery steam generator (HRSG) that receives exhaust gases from the turbine section, wherein the heat exchanger is disposed in the HRSG.

The gas turbine system as in any preceding clause, further comprising a compressor bleed line fluidly coupled to the compressor section and the heat exchanger.

The gas turbine system as in any preceding clause, wherein the injection pressure is between about 100 bar and about 250 bar.

The gas turbine system as in any preceding clause, wherein the injection pressure is between about 1.5 times and about 7 times the combustion chamber pressure.

The gas turbine system as in any preceding clause, wherein the injection temperature is greater than 100° C.

The gas turbine system as in any preceding clause, wherein the pressurizing means includes at least one of a pump and an ammonia compressor; and wherein the pressuring means is disposed upstream of the heat exchanger.

What is claimed is:

1. A method of operating a gas turbine system, the gas turbine system comprising a combustion section having a combustor, a turbine section, and an ammonia supply system, wherein the ammonia supply system comprises a first supply line, a second supply line, a heat recovery steam generator (HRSG) that receives exhaust gases from the turbine section, a first heat exchanger, a second heat exchanger, and a liquid ammonia supply, wherein the first heat exchanger and the second heat exchanger are disposed in the HRSG, wherein the first supply line extends from the liquid ammonia supply to the combustor, wherein the second supply line extends from the first supply line downstream of the first heat exchanger to the combustor, and wherein the method comprises comprising:
    generating flash-atomizing ammonia by:
    pressurizing ammonia from the ammonia supply system to an injection pressure that is greater than a combustion chamber pressure within the combustor;
    heating, at least partially via the first heat exchanger disposed on the first supply line, the ammonia to an injection temperature greater than a boiling temperature of ammonia at the combustion chamber pressure; and
    providing the flash-atomizing ammonia, via at least one of the first supply line and the second supply line, to the combustor, wherein the flash-atomizing ammonia is a liquid ammonia above the boiling temperature that is rapidly dispersed into particles by a sudden release of pressure upon delivery into the combustor.

2. The method as in claim 1, wherein the injection pressure is between about 100 bar and about 250 bar.

3. The method as in claim 1, wherein the injection pressure is between about 1.5 and about 7 times greater than the combustion chamber pressure.

4. The method as in claim 1, wherein heating the ammonia further comprises: heating the pressurized ammonia to an injection temperature of greater than 100° C.

5. The method as in claim 1, wherein the method further comprises:
    heating a second ammonia flow to generate gaseous ammonia;
    providing the gaseous ammonia to the combustor.

6. The method as in claim 5, wherein the combustor comprises a fuel nozzle at a forward end and a fuel injector disposed downstream of the fuel nozzle, and wherein the method further comprises:
    providing the gaseous ammonia to one of the fuel nozzle and the fuel injector; and
    providing the flash-atomizing ammonia to the other of the fuel nozzle and the fuel injector.

7. The method as in claim 1, wherein steam is generated in the HRSG and steam or hot water from a water steam cycle connected to the HRSG is disposed such that ammonia is heated by the steam or hot water from the water steam cycle.

8. The method as in claim 1, wherein the heating step is after the pressurizing step.

9. A gas turbine system comprising:
    a gas turbine comprising, in a serial flow order, a compressor section, a combustion section having a combustor, and a turbine section;
    an ammonia supply system configured to generate flash-atomizing ammonia, the ammonia supply system comprising:
    a liquid ammonia supply;
    an ammonia supply circuit fluidly coupling the liquid ammonia supply to the combustor;
    a pressurizing means disposed on the ammonia supply circuit and configured to pressurize ammonia from the liquid ammonia supply to an injection pressure that is greater than a combustion chamber pressure within the combustor;
    a first heat exchanger and a second heat exchanger disposed in thermal communication on the ammonia supply circuit and configured to heat the ammonia to an injection temperature greater than a boiling temperature of ammonia at the combustion chamber pressure;
    a heat recovery steam generator (HRSG) that receives exhaust gases from the turbine section, wherein the first heat exchanger and the second heat exchanger are disposed in the HRSG;
    a first supply line extending from the liquid ammonia supply to the combustor, wherein the first heat exchanger is disposed on the first supply line; and
    a second supply line extending from the first supply line downstream of the first heat exchanger to the combustor.

10. The gas turbine system as in claim 9, wherein at least one valve is disposed on the ammonia supply circuit and in fluid communication between the first supply line and the second supply line.

11. The gas turbine system as in claim 9, and wherein the second heat exchanger is disposed on the second supply line.

12. The gas turbine system as in claim 9, wherein the combustor includes a fuel nozzle at a forward end and a fuel injector downstream of the fuel nozzle, wherein the first supply line extends to one of the fuel nozzle or the fuel injector, and wherein the second supply line extends to the other of the fuel nozzle or the fuel injector.

13. The gas turbine system as in claim 9, wherein the injection pressure is between about 100 bar and about 250 bar.

14. The gas turbine system as in claim 9, wherein the injection pressure is between about 1.5 times and about 7 times the combustion chamber pressure.

15. The gas turbine system as in claim 9, wherein the injection temperature is greater than 100° C.

16. The gas turbine system as in claim 9, wherein the pressurizing means includes at least one of a pump and an ammonia compressor; and wherein the pressurizing means is disposed upstream of the heat exchanger.

* * * * *